US007081433B2

(12) United States Patent
Rolison et al.

(10) Patent No.: US 7,081,433 B2
(45) Date of Patent: Jul. 25, 2006

(54) CATALYTIC THREE DIMENSIONAL AEROGELS HAVING MESOPOROUS NANOARCHITECTURE

(75) Inventors: Debra Rolison, Arlington, VA (US);
Jeremy Pietron, Washington, DC (US);
Rhonda Stroud, Washington, DC (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 263 days.

(21) Appl. No.: 10/390,257

(22) Filed: Mar. 12, 2003

(65) Prior Publication Data

US 2004/0180787 A1     Sep. 16, 2004

(51) Int. Cl.
  *B01J 29/06* (2006.01)
(52) U.S. Cl. ............. 502/344; 502/305; 502/324; 502/325; 502/326; 502/330; 502/332; 502/333; 502/355; 502/334; 502/354; 502/353; 502/335; 502/336; 502/351; 502/337; 502/350; 502/338; 502/349; 502/339; 502/348; 502/347
(58) Field of Classification Search .......... 502/305, 502/324, 325, 326, 330, 332, 333, 355, 334, 502/354, 335, 353, 336, 351, 337, 350, 338, 502/349, 339, 348, 344, 347
See application file for complete search history.

(56) References Cited

U.S. PATENT DOCUMENTS

| | | | |
|---|---|---|---|
| 5,718,878 A * | 2/1998 | Zhang | 423/610 |
| 6,492,014 B1 | 12/2002 | Rolison et al. | |
| 6,548,440 B1 * | 4/2003 | Pham et al. | 502/71 |
| 6,562,310 B1 * | 5/2003 | Schwarz | 423/338 |
| 6,649,091 B1 * | 11/2003 | Ryan et al. | 252/521.3 |
| 6,695,986 B1 * | 2/2004 | Rolison et al. | 252/521.3 |
| 6,753,287 B1 * | 6/2004 | Weisbeck et al. | 502/107 |
| 6,824,776 B1 * | 11/2004 | Rolison et al. | 424/141.1 |
| 2003/0188991 A1 * | 10/2003 | Shan et al. | 208/113 |
| 2004/0022710 A1 * | 2/2004 | Kaliaguine et al. | 423/263 |
| 2004/0077493 A1 * | 4/2004 | Antonelli | 502/302 |

OTHER PUBLICATIONS

Jeremy J. Pietron et al., "Using Three Dimensions in Catalytic Mesoporous Nanoarchitectures," Nano Lett., 2002, vol. 2, No. 5, 545-549.

Debra R. Rolison, "Catalytic Nanoarchitectures—The Importance of Nothing and the Unimportance of Periodicity,"Science, 1-4, Feb. 24, 2003 prepublication.

Debra R. Rolison et al., "Catalysis in three-dimensional nanoarchitectures: What does bifunctionality mean when the "support" and the "catalyst" are comparably sized?" Abstract of the 225th National Meeting of the American Chemical Society, New Orleans, LA, 23-27 Mar. 2003.

Gratian R. Bamwenda et al., "The influence of the preparation methods on the catalytic activity of platinum and gold supported on TiO2 for CO oxidation," Catalysis Lett. 44 (1997) 83-87.

Debra R. Rolison et al., "Electrically conductive oxide aerogels: new materials in electrochemistry,"J. Mater. Chem., 2001, 11(4), 963-980.

Naoki Toshima et al., "Various ligand-stabilized metal nanoclusters as homogeneous and heterogeneous catalysts in the liquid phase," Appl. Organometal. Chem., 2001, 15, 178-196.

Mathias Brust et al., "Synthesis of Thiol-derivatised Gold Nanoparticles in a Two-phase Liquid-Liquid System," J. Chem. Soc., Chem. Commun., 1994, 801-802.

Michael J. Hostetler et al., "Alkanethiolate Gold Cluster Molecules with Core Diameters from 1.5 to 5.2 nm: Core and Monolayer Properties as a Function of Core Size," Langmuir, 1998, 14, 17-30.

Michael J. Hostetler et al., "Monolayers in Three Dimensions: Synthesis and Electrochemistry of w-Functionalized Alkanethilate-Stabilized Gold Cluster Compounds," J. Am. Chem. Soc., 1996, 118, 4212-4213.

(Continued)

*Primary Examiner*—Christina Johnson
(74) *Attorney, Agent, or Firm*—John J. Karasek; Amy L. Ressing

(57) ABSTRACT

Gold-titania (Au—$TiO_2$) composite aerogels and ambigles were synthesized, characterized, and tested as ambient temperature catalysts for carbon monoxide. Adding alkanethiolate-monolayers-protected gold clusters (with ~2 nm Au cores) directly to titania sol before gelation yields uniformly dispersed guests in the composite aerogel. The Au guests aggregate to 5 to 10 nm upon calcination to remove alkanethiolate and crystallize amorphous titania to anatase. The resulting composite aerogel exhibits high catalytic activity toward CO oxidation at room temperature at Au particle sizes that are essentially inactive in prior Au—$TiO_2$ catalysts. Transmission electron microscopy illustrates the three-dimensional nature of the catalytic nanoarchitecture in which gold guests contact multiple anatase nanocrystallites.

17 Claims, 2 Drawing Sheets

OTHER PUBLICATIONS

Figure 1:
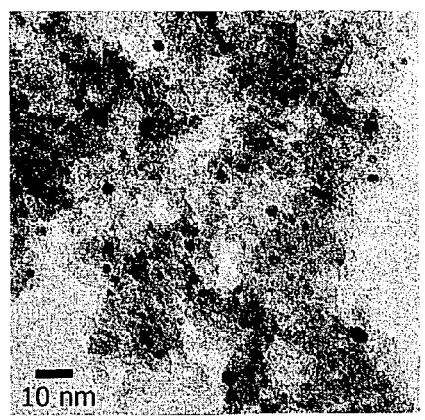

Roychelle S. Ingram et al., "Poly-hetero-w-functionalized Alkanethiolate-Stabilized Gold Cluster Compounds," J. Am. Chem. Soc., 1997, 119, 9175-9178.

Jeremy J. Pietron et al., "Electrochemically induced surface modification of titanols in a 'nanoglued' titania aerogel-silica aerogel composite film," J. Non-Crystalline Solids, 285, 2001, 13-21.

Geula Dagan et al., "$TiO_2$ Aerogels for Photocatalytic Decontamination of Aquatic Environments," J. Phys. Chem., vol. 97, No. 49, 1993, 12651-12655.

* cited by examiner

CATALYTIC THREE DIMENSIONAL AEROGELS HAVING MESOPOROUS NANOARCHITECTURE

BACKGROUND OF THE INVENTION

1. Field of the Invention

The present invention relates to catalysts uniformly distributed in mesoporous aerogels and ambigels having a three-dimensional nanoarchitecture and a metal-oxide framework. Specifically disclosed are Au—$TiO_2$ aerogels and their oxidation of carbon monoxide. The gold is inserted into the aerogel as a monolayer-protected cluster (MPC). Much of this invention was disclosed in Rolison et al., *Nano Letters*, 2002, 2(5), 545–549, and Rolison et al., *Science*, 2003, in press which is incorporated herein by reference including the references cited therein.

2. Description of Background Art

An extensive literature describes the ability of nanometer-sized gold supported on titania (Au/$TiO_2$) to catalyze the low-temperature oxidation of carbon monoxide. The mechanism of oxidation—in particular the individual roles of gold and titania—is still being elucidated. Agreement exists that oxygen is activated at either titania or the gold-titania interface, while carbon monoxide undergoes weak reversible adsorption at the surface of the gold nanoparticle. The surface diffusion of adsorbed CO on the gold to the activated oxygen sites at the interface, with possible spillover of activated oxygen to the gold, enhances oxidative turnover.

Studies by Haruta and coworkers, *Catal. Lett.* 1997, 44, 83–87 incorporated herein by reference, show that 3-nm gold particles supported on titania optimize the effectiveness of catalytic oxidation of carbon monoxide. Gold sized at 3 nm appears to balance the need for a large ratio of perimeter to bulk, (i.e., high catalyst dispersion) while still presenting enough surface area for carbon monoxide adsorption and surface diffusion. Smaller particles are thought to be partially buried in the titania support, while larger particles are thought to lose carbon monoxide to desorption before diffusion to the active perimeter permits oxidation. Although 12-nm Au supported on iron oxide remains active for CO oxidation, which argues for a less size-dependent mechanism, such as spillover involving reactive atomic oxygen, titania-supported catalysts with gold particles larger than 5-nm are reported to be less active for CO oxidation.

SUMMARY OF THE INVENTION

We now report the synthesis, characterization, and catalytic efficacy of gold-titania (Au—$TiO_2$) composite aerogels and ambigels as ambient-temperature oxidation catalysts for carbon monoxide. The composite aerogel offers a catalytic nanoarchitecture in which a framework in the form of a network of nanoscopic titapia, or other activating oxides such as iron oxide, or cerium oxide, serves as the host and alkanethiolate-monolayer protected gold clusters (Au-MPCs ) are guests. We previously showed that about-to-gel sol will nanoglue solid guests into the gel's nanostructure to create materials that retain molecular access to the guest and add the properties of the guest to the composite (U.S. Pat. No. 6,492,014, incorporated herein by reference).

Aerogels are nanoscopic pore-solid architectures with high surface area (150–1000 $m^2/g$) and a continuous mesoporous network. The high surface area makes aerogels particularly attractive for catalysis and should allow for deposition of large effective concentrations of gold or other metal catalyst nanoparticles while maintaining a well dispersed population of particles. The three dimensional (3-D) continuous mesoporous network facilitates rapid diffusion of reactants to active sites in the aerogel, such that mass transport occurs on the order of open-medium diffusion rates. As mass transport must be factored into the kinetics of any catalyst, the continuous mesoporous structure of aerogels will be critical to their performance as composite, nanostructured catalysts, oxide supported catalysts in particular. A variation on aerogels is ambigels, or ambient-pressure processed aerogel-like materials, Rolison and Dunn, *Journal of Materials Chemistry* 2001, 11, 963–980 and incorporated herein by reference. Ambigels retain many of the properties of aerogels, including continuous mesoporosity and high surface areas, but are somewhat more dense and may have somewhat lower specific surface areas than aerogels, as they are processed differently (but more conveniently) than aerogels. The differences in processing will be described in greater detail below.

This invention also includes the use of monolayer-protected clusters (MPCs), in this case monolayer-protected gold clusters (Au-MPCs) in the preparation Au/$TiO_2$ catalysts. More general ligand-stabilized colloids are described by Toshima et al., *Applied Organometallic Chemistry* 2001, 15, 178–196 and incorporated herein by reference. Gold-MPCs like those used in our specific example here were first synthesized by Brust et al. *J. Chem. Soc. Chem. Chem. Comm.* 1994, 801–802 and incorporated herein by reference, and consist of 2–3 nm gold cores containing anywhere from a few dozen to a few hundred gold atoms, depending on preparation conditions, which are protected from aggregation by thiolated organic capping agents. A mixed monolayer can be created by synthesizing gold-MPCs in the presence of mixed ligands, or by making permethyl-terminated alkylthiolate-protected MPCs and then stoichiometrically exchanging with the ligands of choice.

Using Au-MPCs in the preparation of nanoparticle-on-oxide catalysts is desirable because one starts with Au(0) particles with a relatively well-controlled size distribution. Au-MPCs can be isolated and stored as dry compounds, thus providing chemical and processing flexibility when designing and preparing nanocomposites. Judicious choice of protecting ligands leads to particles that dissolve readily in solvents suitable for sol-gel chemistry. Finally, the protecting ligand may also be chosen such that it specifically attaches to hydroxyls on the metal oxide colloids in the about-to-gel sol, giving good dispersion of the metal particles in the final gel.

Gold nanoparticles are known to be active as small molecule oxidation catalysts when supported on a number of crystalline and amorphous oxides. The MPCs-aerogel synthetic strategy can be extended to a number of oxides that are known to promote small molecule oxidation by gold nanoparticles absorbed thereon. Other oxides include those of iron, cobalt, manganese, aluminum, vanadium, cerium, and any other that are formed via sol-gel process and can form a three-dimensional pore-solid network that acts as a support for MPCs.

The Au—$TiO_2$ aerogel-derived architecture may effectively catalyze other oxidative reactions such as olefin epoxidation and sulfur oxidation. Furthermore, MPCs of other catalytically important metals, including but not limited to Ag, Pd, Pt, and their alloys, can be synthesized and incorporated into aerogel 3-D architecture, extending the flexibility of the 3-D architecture to other catalytic reactions, including reductive reactions such as hydrogenation over Pd.

DETAILED DESCRIPTION OF THE INVENTION

Au-MPCs are synthesized and modified by literature procedures described in Brust et al. above and in Murray et al., in *Langmuir*, 1998, 14, 17–30 and incorporated herein by reference. The size and purity of mixed-monolayer Au clusters are more controllable if one makes gold-decanethiolate (Au-DT) clusters first and subsequently performs ligand-exchange reactions to get the final desired monolayer compositions, Murray et al., *J. Am. Chem. Soc.* 1996, 118, 4212–4213 and *Langmuir* 1999, 56, 7–10; Murray et al., *J. Am. Chem. Soc.* 1997, 119, 9175–9178, the three references incorporated herein by reference. In place-exchange reactions, either mercaptoundecanoic acid (MUA; at 50% stoichiometric) or 11-mercaptoundecanol (MU; in 5-fold excess for nearly complete exchange) is added to a solution of Au-DT clusters in toluene and stirred for 5 days. After rotary evaporation of the toluene, Au-MUA: DT clusters are suspended in water and collected on a frit.

Monolayer-protected Au-titania composite gels (Au—$TiO_2$) are made by adapting previously described procedures in Pietron et al., *J. Non-Cryst. Solids* 2001, 285, 13–21 and Dagan et al., *J. Phys. Chem.* 1993, 97, 12651–12655 both references incorporated herein by reference. Ethanolic solutions of Au-MPC and titanium(IV)isopropoxide are added to a stirred mixture of $H_2O$, 70% nitric acid, and Au-MPC in ethanolic solution, forming a sol which is allowed to gel and age. Alternatively, ethanol and titanium(IV)isopropoxide are added to a stirred mixture of ethanol, $H_2O$, and 70% nitric acid, and allowed to stir for 1 minute creating a titania sol, after which ethanolic solutions of Au-MPC are added to the pre-formed sol. In either case, the gels are subsequently processed as aerogels which involves loading under acetone into a supercritical dryer (Fisons Bio-Rad E3100) and rinsing with liquid $CO_2$ over ~4 h before heating above the critical temperature ($T_c(CO_2)$=31° C.) and then venting the pressure. The uncalcined aerogels feature well-dispersed 2–3 nm Au particles, as shown by transmission electron microscopy (FIG. 1).

FIG. 1 shows the transmission electron micrograph of uncalcined Au—$TiO_2$ composite aerogel, containing 6.3% Au derived from mixed monolayer Au clusters with 1:1 molar mixture of 11-mercaptoundecanoic acid and decanethiol added to the titania sol. The average diameter of the gold core in the MPC guests in the composite aerogel is 2.3 nm.

In an alternate procedure, ambigels are created by replacing the supercritical drying step with further rinses using lower surface-tension nonpolar solvents, such as hexane. After several rinses with hexane, the gels are dried by covering the containers with a solvent-resistant film, making a pinhole in the film, and heating the gels to about 50° C., slowly evaporating the solvent over 1–3 days.

In either case, the dry gels are heat-treated under vacuum to remove residual water and organics and then calcined in air (2° C. $min^{-1}$ to 425° C.). The resultant alkanethiolate-free aerogels or ambigels (in which the titania has crystallized and the alkanethiolate has been pyrolyzed) consist of broken monolithic pieces, very dark purple in color. The pieces are gently ground into sub-mm grains with an agate mortar and pestle before analytical or catalytic studies.

Figure 2A:
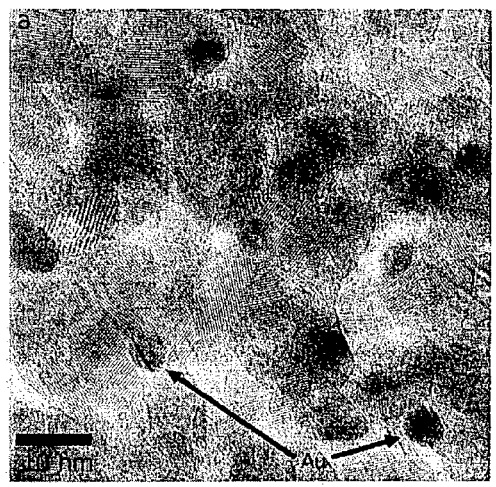
Figure 2B:
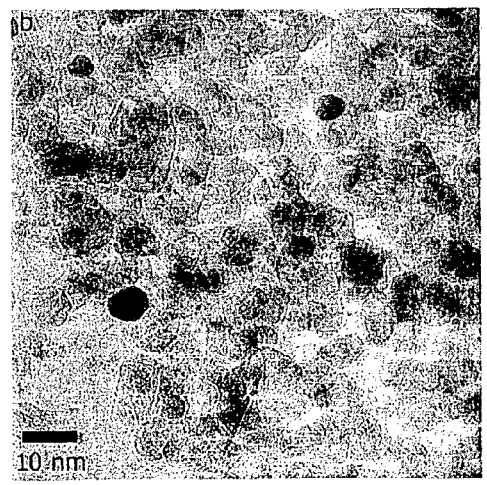

After calcination to crystallize amorphous titania to anatase $TiO_2$ and to burn off the alkanethiolate ligands, the ~2-nm Au particles in the Au—$TiO_2$ composite aerogels and ambigels segregate to the surfaces of the titania nanocrystals and aggregate to average diameters of 5–10 nm. This calcination-induced growth can be seen by high-resolution TEM, whether mixed-monolayer (Au-MUA:DT) or single-ligand monolayers of 11-mercaptoundecanol (Au-MU) protect the Au clusters in FIGS. 2a and 2b, respectively. FIG. 2 shows transmission electron micrographs of Au—$TiO_2$ aerogels calcined at 425° C. The lattice fringes visible arise from anatase titanium dioxide nanocrystallites. FIG. 2a is of 3.6 wt. % Au, prepared using Au-MUA—DT; average particle size in the calcined composite aerogel is 5.5 nm. Note that some gold particles appear to contact multiple anatase particles. FIG. 2b is 4 wt. % Au, prepared using Au-MU; average particle size in the calcined composite aerogel is 8.1 nm, this sample is also well crystallized, but lattice fringes have been suppressed due to the choice of an objective aperture that increases the contrast between Au and titania. The calcined composite aerogels and ambigels have primary $TiO_2$ particle sizes of 10–12 nm, which is comparable to the average Au particle size. This size comparability allows individual Au particles to make contact with multiple titania particles, in contrast to morphologies in which the titania particle size greatly exceeds the Au particle size. The crystallinity of titania in the post-calcination composite aerogels is evident by the pervasive lattice fringes seen in FIG. 2a. Phase identification as anatase was verified by electron and X-ray diffraction for composites derived from both Au-MPC guests. The Raman spectrum of MPC-derived Au—$TiO_2$ composite aerogel (1 wt % Au) has peaks characteristic of anatase $TiO_2$ at 405, 520 and 630 $cm^{-1}$. The results of $N_2$ physisorption measurements (Micromeritics ASAP 2010) are summarized in Table 1 for Au—$TiO_2$ composite aerogels and ambigels; with Brunauer-Emmett-Teller (BET) surface areas and average pore sizes and distributions (BJH equation with cylindrical pore geometry). Powdered Au—$TiO_2$ aerogels are analyzed by X-ray photoelectron spectroscopy (Fisons 220iXL, monochromatic Al—Kα X-rays, 250×1000-μm spot), atomic absorption spectroscopy (AAS; Galbraith Laboratories) microspot Raman spectroscopy (Renishaw Ramiscope; 514.5-nm line of the Ar-ion laser), X-ray diffraction (Bruker D8 Advance), EPR spectroscopy, and UV-visible spectroscopy.

TABLE 1

Surface area and porosimetry of Au—$TiO_2$ composite aerogels and ambigels

| Weight % of Au in Au—$TiO_2$ aerogel or ambigel | Type of Au-MPC and amount used in 8 mL of $TiO_2$ sol | BET Surface Area [$m^2 g^{-1}$] | BJH Pore Diameter; desorption [nm] | Cumulative Pore Volume [mL $g^{-1}$] |
|---|---|---|---|---|
| 1.9–2.4% (XPS) | 35 mg of Au-MU | 204 | 7.0 | 0.44 |
| 5–7% (est.) | 60 mg of Au-MU | 155 | 15.6 | 0.72 |
| 1% (est.) | 17 mg of Au-MUA:DT | 179 | 8.7 | 0.48 |
| 3.6% Au (AAS) | 40 mg of Au-MUA:DT | 142 | 16.4 | 0.72 |

TABLE 1-continued

Surface area and porosimetry of Au—TiO$_2$ composite aerogels and ambigels

| Weight % of Au in Au—TiO$_2$ aerogel or ambigel | Type of Au-MPC and amount used in 8 mL of TiO$_2$ sol | BET Surface Area [m$^2$g$^{-1}$] | BJH Pore Diameter; desorption [nm] | Cumulative Pore Volume [mL g$^{-1}$] |
|---|---|---|---|---|
| 6.3% Au (AAS) | 80 mg of Au-MUA:DT | 148 | 11.3 | 0.56 |
| 10% Au (est.) | 120 mg of Au-MUA:DT | 94 | 11.8 | 0.37 |
| 1% est-ambigel | 17 mg of Au-MUA:DT | 186 | 5.9 | 0.34 |

To study the ambient-temperature oxidation of CO, powdered Au—TiO$_2$ composite aerogel or ambigel is loaded into a glass reactor (2.45 mm i.d. tube) between glass-wool plugs and connected via polyethylene fittings to ¼" copper tubing. Oxygen and carbon monoxide are mixed directly through a T-joint with exit flow rates varied between 0.3 and 2.0 mLs$^{-1}$. The ratios of O$_2$:CO are varied from 1:2 to 25:1 to measure the effect of stoichiometry on measured rate constants. The reactor outlet stream is collected in gas-sampling bags and analyzed by gas chromatography. Rate constants are calculated using the total gas flow rate, and the balance of gases as measured by gas chromatography.

The activity of Au—TiO$_2$ composite aerogels for ambient-temperature oxidation of carbon monoxide was determined as a function of weight loading and/or average size of included gold; these data are summarized in Table 2. The oxidation rate of CO, measured in moles converted per second per gram catalyst, rise monotonically with gold loading. The 3.6 wt % Au—TiO$_2$ aerogel composite derived from Au—MUA:DT performs very well, converting ~1×10$^{-5}$ mols$^{-1}$ of carbon monoxide to carbon dioxide per gram catalyst, despite doing so with 5.5-nm Au particles. A comparably loaded Au—TiO$_2$ aerogel with 8.1-nm Au particles (made using Au-MU) is also active, but 25-times less so. Catalytic activity continues to rise for Au weight loadings>3.6 wt %, with rates of 2×10$^{-5}$ mols$^{-1}$ g$_{cat}^{-1}$ for 10 wt % Au—TiO$_2$ composite aerogel. The single ambigel trial yields a rate constant of 2×10$^{-7}$ mols$^{-1}$ g$_{cat}^{-1}$ for CO oxidation, which is roughly 10 times smaller than the value reported for the same Au-modified titania gel processed as an aerogel. Given the smaller average pore diameter and pore volume of the ambigel version of the compositionally identical aerogel, it is likely that mass transport of reacting gases is less efficient and gold is somewhat less accessible in the ambigel version of the material.

In our study, the gas flow rates were varied considerably from experiment to experiment (ranging from linear flow rates of 1–10 cm s$^{-1}$); yet, little or no measurable effect of flow conditions on measured rate constants was observed.

TABLE 2

Activity of Au—TiO$_2$ composite aerogels for ambient-temperature oxidation of CO

| Type of Au-MPC precursor | Weight % of Au in catalyst | Rate constant per gram of catalyst [(mol s$^{-1}$ g$_{cat}^{-1}$) × 10$^{-6}$] | Gold-normalized rate constant [(mol s$^{-1}$ mol$_{Au}^{-1}$) × 10$^{-2}$] |
|---|---|---|---|
| Au-MU | 1.9–2.4% (XPS) | 4–6 | 3.3–4.9 |
|  | 5–7% (est.) | 0.4 | 0.1(est.) |
| Au-MUA:DT | 1% (est.) | 2–3 | 3.9–5.9 (est.) |
|  | 3.6% Au (AAS) | 8–15 | 4.2–8.0 |
|  | 6.3% Au (AAS) | 13–20 | 4.1–6.3 |
|  | 10% Au (est.) | 21–27 | 4.1–5.3 |
| Au-MUA:DT ambigel | 1% (est.) | 0.2 | 0.1 (est.) |

It is unlikely that CO oxidation at Au—TiO$_2$ composite aerogels involves a radically different chemical mechanism than at other Au/TiO$_2$ catalysts. We propose that Au—TiO$_2$ composite aerogel catalysts perform so well for particle sizes that offer minimal activity for more standard Au/TiO$_2$ catalysts because multiple Au∥TiO$_2$ interfaces form at many of the Au particles as the TiO$_2$ aerogel densifies during crystallization and as the ~2-nm gold cores aggregate. High resolution TEM supports this supposition. Although in an individual TEM micrograph, contact between particles is difficult to distinguish from mere overlap in projection, the difference is clear in a through-focus series of micrographs. For the Au—TiO$_2$ composite aerogels shown in FIG. 2, we observe that the Au particles contact multiple anatase nanoparticles.

The ability of the aerogel nanoarchitecture to create multiple points-of-contact of Au to TiO$_2$ contrasts with the single interfacial perimeter that forms when gold is deposited onto pre-formed TiO$_2$ or hydrous titanium oxide powders. Multiple Au∥TiO$_2$ junctions shorten the average lateral diffusion distance that CO must travel to the oxygen-active interface, as compared to the single-perimeter case. This multiplicity of contact between the Au guest and the TiO$_2$ host, which provides a three-dimensional control of the reaction zone, is depicted schematically in FIG. 3. Particle size still matters in Au—TiO$_2$ composite aerogels, however, as catalytic performance diminishes when the size of the Au guests reaches ~8.1 nm.

Others have proposed a similar "extended perimeter" hypothesis when comparing formation of particles from organogold complexes deposited by CVD on commercial nanocrystalline and amorphous TiO$_2$. The average particle size of Au deposited on the nanocrystalline support was 8 nm, yet modest rates of CO oxidation (compared to rates we report here) were still observed, in contrast to the sharp drop-off in activity for particles>~3 nm reported previously when using colloidal gold deposited on commercial nanocrystalline titania.

In summary, a new way to make highly active Au—$TiO_2$ catalysts has been described. Au-MPCs can be tailored in terms of their surface characteristics and their core sizes, making them very attractive for molecular-level control of architecture in supported catalysts. Au-MPCs allow introduction of the same type of metal particle at any step in the processing of nanocomposites, allowing one to optimize for a given application. Aerogel and ambigel architectures provide important 3-D design and application flexibility through the bicontinuity of the nanoscopic networks of catalyst and mesopores.

Figure 3:
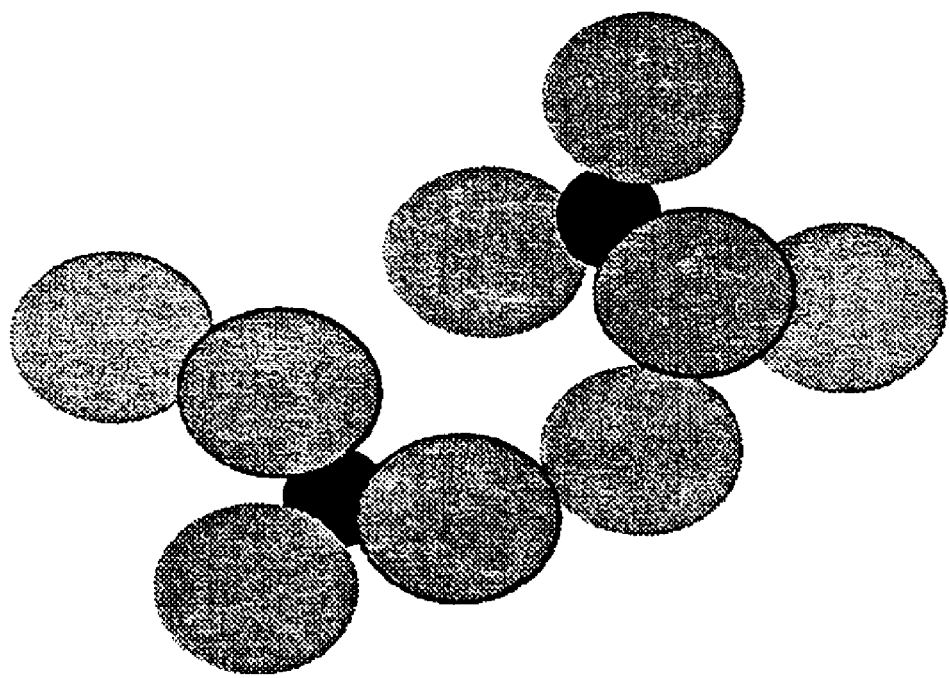

FIG. 3 depicts schematically the enhancements of Au/$TiO_2$ contacts within Au/$TiO_2$ composite aerogels.

The high porosity of aerogels and ambigels and the synthetic flexibility of Au-MPC guests have allowed us to structure the titania support around nanoparticulate metal catalysts while retaining high activity for the included metal. The high surface area of aerogels may allow for deposition of unprecedented amounts of metal on the support. Activities for CO oxidation comparable to the best Au—$TiO_2$ catalysts described in the literature have been achieved, with few steps yet taken toward optimization.

EXPERIMENTS

In the procedure below, the gold MPCs used had an average core diameter of 3 nm and an approximately 1:1 mixed monolayer of decanethiolate and 11-mercaptoundecanoic acid, and are referred to as Au-MUA-DT in the disclosure and in the main publication describing the invention.

Detailed Synthesis of Gold Aerogel and Ambigel Composites

Method 1

In a plastic beaker, 4.1 g of ethanol were added to 2.60 g, or 9.1 millimoles of titanitun (IV) isopropoxide.

In a second plastic beaker, 0.353 g, or 20 millimoles of water, 0.062 g of 70% nitric acid (0.9 millimoles of nitric acid), and 4.1 g of ethanol were added together.

A magnetic stir bar was added to the second beaker, the contents were stirred for 1 minute. The contents of the two beakers were mixed, and the mixture was stirred for 1 minute, followed by addition of 2 mL of a 8.5 mg/mL solution of gold-MPC creating a dark purple sol, which was allowed to stir for another minute and subsequently poured into a plastic mold.

Method 2

In a plastic beaker, 4.1 g of 4 mg/mL MPC/Ethanol solution (or 20 mg of MPC in 5 mL ethanol) was added to 2.60 g, or 9.1 millimoles titanium (IV) isopropoxide.

In a second plastic beaker, 0.353 g, or 20 millimoles water, 0.062 g of 70% nitric acid (0.9 millimoles nitric acid), and 4.1 g of 4 mg/mL MPC/Ethanol solution (20 mg of MPC in 5 mL of ethanol) were added together.

A magnetic stir bar was added to the second beaker, the contents were stirred for 1 minute. The contents of the two beakers were mixed, and the mixture was stirred for 1 minute and subsequently poured into a plastic mold.

Both Methods:

The mold was covered with an air-tight, stretchable wax film. Within 3 hours the dark purple (from the MPC concentration) sol had formed a firm gel, which was allowed to age overnight.

After aging the gel overnight, an excess of acetone was poured over the gel to quench the aging process. The gel was removed from the mold and broken into approximately half-centimeter-sized pieces and placed in a glass jar under acetone. The acetone was changed 3 to 4 times daily for three days to rinse the reagents from the bulk of the gel.

Processing of Gold-aerogel and Gold-ambigel Composites

Aerogel Processing:

After a total of 12 acetone rinses, the gels were loaded, under acetone, into a Fisons 3100 Critical Point Dryer. Liquid carbon dioxide at 10° C. and approximately 750 psi (~50 atm pressure) is flushed slowly through the dryer for 5 to 10 minutes every 40 to 60 minutes, removing the acetone and filling the pores with liquid $CO_2$. After about 7 rinses, the temperature in the dryer is raised from 10° C. through the $CO_2$ critical temperature, about 31° C. and on up to 40° C., over a period of about 30 minutes. The dryer is left at 40° C., now containing the gels and $CO_2$ in its supercritical fluid phase (at a pressure of 1200 to 1400 psi, or 75 to 90 atm), for about 45 minutes. The pressure is then slowly vented to ambient over a period of about 30 minutes. The gel pieces are then removed from the dryer.

Ambigel Processing:

After a total of 12 acetone rinses, the gels were further rinsed two times with 2:1 (vol:vol) acetone:hexane, two times with 1:1 acetone:hexane, two times with 1:2 acetone:hexane, and finally nine times with hexane alone, with roughly three hours of equilibration time between each rinse and 3 to 4 rinses per day. After the last hexane rinse, the jars in which the gel pieces were stored was covered with a solvent-resistant film. A pinhole was made in the film and the gels pieces and solvents were heated to 50° C. The solvent evaporated over about three days yielding dry, dark purple solid gels.

Heat Treaments (Calcining), Both Aerogels and Ambigels:

The dry gel pieces were then heated to 110° C. under vacuum for three hours to remove residual water, followed by further heating at 220° C. for three more hours to remove residual organic material. The pieces were removed from the oven and transferred to a furnace and heated from room temperature to 425° C. at 2° C./minute, held for two hours at 425° C. and cooled to room temperature again at 2° C./minute, yielding the final product that was used for characterization and catalytic studies.

The weight fraction of the gold can be varied linearly between 1% and 10% by adjusting the fraction of dissolved gold MPC in the ethanol solvents in the initial sol-gel process.

| MPC concentration in ethanol | total mass of MPCs in preparation | Final weight percent gold in the final Au—$TiO_2$ composite |
|---|---|---|
| 1 mg/mL | 17 mg | 1% |
| 4 mg/mL | 40 mg | 3.6% |
| 8 mg/mL | 80 mg | 6.3% |
| 12 mg/mL | 120 mg | 10% |

Au-MPC Synthesis.

Monolayer-protected gold clusters (MPCs) were synthesized according to methods first described by Brust referenced above and later extended and modified by Murray, *Langmuir* 1998, referenced above. Typically 0.73 g (2.1 millimoles) of HAuCl$_4$·xH$_2$O (Alfa Aesar) in ca. 50 mL of H$_2$O was added to a vigorously stirred solution of 2.8 g of tetraoctylammonium bromide (TOABr) (Aldrich) in ca. 200 mL of toluene. The Au(III) salt was transferred from the aqueous phase to toluene by the phase-transfer catalyst (TOABr), resulting in a dark orange organic phase. The aqueous phase was then removed. To the stirred organic phase, 0.13 g (0.7 millimoles) of decanethiol were added. The solutions were stirred for 30 minutes. 0.8 g (21 millimoles) of NaBH$_4$ in ca. 50 mL H$_2$O were added to the stirred solution, which immediately turned a very dark (almost black) brown-purple color. The reaction was allowed to proceed for at least three hours. The aqueous phase was removed and discarded. Toluene was removed by rotary evaporation, yielding a waxy black solid. The product was suspended in ethanol 3 times followed by decanting of the ethanol to remove residual TOABr, then re-suspended in ethanol and collected on a medium-pore glass frit funnel. Typically about 0.34 g of MPC was collected (~70%). Some of the product loss likely occurs during the washing and decanting. Decanethiol-MPC was found to be free of phase-transfer catalyst and unreacted ligand by NEAR spectroscopy. DT-MPCs, as-prepared, are soluble in most nonpolar, aprotic solvents.

Ligand exchange reactions described by Murray and coworkers, 1996 and 1997 referenced above were used to get the final desired monolayer compositions. In place-exchange reactions, either 11-MUA or 11-mercaptoundecanol (Aldrich) was added to a stirred solution of DT-MPC in toluene. In the case of 11-mercaptoundecanol (11-MU), a ca. 5-fold excess (based on estimation of the average number of ligands on each MPC, by preparation conditions and the corresponding MPC) of 11-MU was added, to completely or nearly completely exchange 11-MU for decanethiol. In the case of 11-mercaptoundecanoic acid (11-MUA), a quantity of 11-MUA stoichiometrically equal to ca. ½ of the ligands on the MPCs was added to effect approximately equivalent exchange. In both cases, exchange was allowed to proceed at room temperature for 5 days. The mixed-monolayer, 11-MUA:DT-MPC is an amphiphilic macromolecule, and removing excess displaced ligand after exchange is labor intensive. Thus, after rotary evaporation, the WPCs were simply suspended in water (Barnstead Nanopure) and collected on a frit funnel. By estimation, a product that was at most ca. 8% impure resulted. As the MPCs were ultimately incorporated into an aerogel that was calcined to remove all organics in the final processing step, the impurity was seen as unimportant.

The invention claimed is:

1. A method for making catalytic mesoporous aerogels having three-dimensional nanoarchitecture having individual catalytic metal particles in contact with multiple metal oxide particles, comprising:
   A. forming a monolayer-protected cluster or ligand-stabilized colloid of a catalytic metal;
   B. forming a sol of a metal oxide;
   C. mixing said monolayer-protected cluster or ligand-stabilized colloid of a catalytic metal with said metal-oxide sol, and allowing said sol to form a gel;
   D. extracting said gel with supercritical carbon dioxide to form an aerogel;
   E. calcining said aerogel to form said catalytic mesoporous aerogel having three-dimensional nanoarchitecture with said metal cluster distributed therein, wherein individual catalytic metal particles are in contact with multiple metal oxide particles.

2. A method for making catalytic mesoporous aerogels having three-dimensional nanoarchitecture having individual catalytic metal particles in contact with multiple metal oxide particles, comprising:
   A. forming a monolayer-protected cluster or ligand-stabilized colloid of a catalytic metal;
   B. forming a sol of a metal oxide and said cluster or colloid of a catalytic metal by mixing together said monolayer-protected metal cluster or ligand-stabilized colloid of a catalytic metal and a metal-oxide precursor, said precursor being converted to said metal oxide;
   C. allowing said sol to form a gel
   D. extracting said gel with supercritical carbon dioxide to form an aerogel;
   E. calcining said aerogel to form said catalytic mesoporous aerogel having three-dimensional nanoarchitecture with said metal cluster distributed therein.

3. A method for making catalytic mesoporous ambigels having three dimensional nanoarchitecture having individual catalytic metal particles in contact with multiple metal oxide particles, comprising:
   A. forming a monolayer-protected cluster or ligand-stabilized colloid of a catalytic metal;
   B. forming a sol of a metal oxide;
   C. mixing said monolayer-protected cluster or ligand-stabilized colloid of said catalytic metal with said metal-oxide sol, and allowing said sol to form a gel;
   D. rinsing said gel with a low-surface-tension solvent;
   E. drying said gel by evaporating said low-surface-tension solvent, yielding an ambigel;
   F. calcining said aerogel to form said catalytic mesoporous ambigel having three-dimensional nanoarchitecture with said metal cluster distributed therein.

4. A method for making catalytic mesoporous ambigels having three-dimensional nanoarchitecture, having individual catalytic metal particles in contact with multiple metal oxide particles, comprising:
   A. forming a monolayer-protected cluster or ligand-stabilized colloid of a catalytic metal;
   B. forming a sol of a metal oxide and said cluster or colloid of a catalytic metal by mixing together said monolayer-protected metal cluster or ligand-stabilized colloid of a catalytic metal and a metal-oxide precursor, said precursor being convened to said metal oxide;
   C. allowing said sol to form a gel;
   D. rinsing said gel with a low-surface-tension solvent;
   E. drying said gel by evaporating said low-surface-tension solvent, yielding an ambigel;
   F. calcining said ambigel to form said catalytic mesoporous ambigel having three-dimensional nanoarchitecture with said metal cluster distributed therein.

5. The method according to claim 1, 2, 3, or 4, wherein said catalytic metal is selected from the group consisting of gold, silver, platinum, palladium, and their alloys.

6. The method according to claim 1, 2, 3, or 4, wherein said metal oxide is selected from the group consisting of titanium, iron, cobalt, manganese, vanadium, cerium and aluminum.

7. The method according to claim 1, 2, 3, or 4, wherein said catalytic metal is gold.

8. The method according to claim 1, 2, 3, or 4, wherein said metal oxide is that of titanium.

9. The method according to claim 1, 2, 3, or 4, wherein said mesoporous aerogel or ambigel comprises gold catalytic metal clusters distributed in a titanium dioxide mesoporous aerogel.

10. The method according to claim 1, 2, 3, or 4, wherein said monolayer-protected cluster of a catalytic metal comprises a catalytic metal with a ligand selected from the group consisting of alkane thiolates having 4–16 methylene units and mixtures thereof.

11. The method according to claim 1, 2, 3, or 4, wherein said monolayer protected cluster of said catalytic metal comprises said catalytic metal with a ligand selected from the group consisting of 11-mercaptoundecanol, mercaptoundecanoic acid, and equivalents thereof.

12. A composition of matter, comprising: A calcined mesoporous gel having three-dimensional nanoarchitecture and a catalytic metal cluster distributed therein, said gel being selected from the group consisting of aerogels and ambigels, said catalytic metal clusters having individual catalytic metal particles being in contact with multiple metal oxide particles.

13. A composition according to claim 12, wherein said gel has a metal-oxide framework selected from the group consisting of the oxides of titanium, iron, cerium, vanadium, aluminum, cobalt, and manganese.

14. A composition according to claim 12, wherein said catalytic metal is selected from the group consisting of gold, platinum, palladium, silver, nickel, and alloys thereof.

15. A composition according to claim 12, wherein said metal cluster is gold and said gel is titanium dioxide, said gold cluster being about 5 to 10 nm diameter.

16. A composition according to claim 15, wherein said gel is an aerogel.

17. A composition of matter, comprising: a calcined mesoporous aerogel having three dimensional nanoarchitecture, said aerogel having a titanium-oxide framework with 5 to 10 nm diameter gold clusters distributed therein, said gold clusters having individual gold particles in contact with multiple metal oxide particles.

* * * * *